Patented Jan. 11, 1938

2,104,782

UNITED STATES PATENT OFFICE 2,104,782

SULPHATED ESTERS OF POLYCARBOXYLIC ACIDS

James H. Werntz, Marshallton, Del., assignor to E. I. du Pont de Nemours & Company, Wilmington, Del., a corporation of Delaware No Drawing. Application December 14, 1934, Serial No. 757,465

18 Claims. (Cl. 260—99.12)

This invention relates to new chemical compounds, and more particularly refers to sulphated esters of polycarboxylic acids, and methods for their production.

It is an object of this invention to produce compounds which are particularly adapted for use as wetting, detergent, emulsifying, and dispersing agents. A further object is to obtain new and useful esters. A still further object is to produce compounds which are stable in acid solution and in hard water. A still further object is to produce a series of compounds which may be substituted for or used in admixture with soap and soap-like products in the various processes wherein such products have heretofore been used or are capable of use. Additional objects will become apparent from a consideration of the following specification and claims.

These objects are attained according to the herein described invention wherein sulphated derivatives of esterified polycarboxylic acids, the polycarboxylic acid radical of which contains less than 15 carbon atoms, are produced. In a more limited sense the invention pertains to the sulphation of esterified non-aromatic polycarboxylic acids which contain less than 15 carbon atoms. In its preferred embodiment this invention relates to salts of sulphuric acid esters of aliphatic polycarboxylic acids containing less than 15 carbon atoms, wherein at least one of the esterifying radicals is the radical of a normal primary alcohol containing at least 8, and particularly from 12 to 18, carbon atoms.

The invention may be more readily understood by a consideration of the following illustrative examples:

Example 1

Di-(9,10-octadecenyl) succinate was treated with cold concentrated sulphuric acid. When neutralized with caustic soda solution, the product was soluble in water.

Example 2

Dodecyl acid citrate was treated in the cold with concentrated sulphuric acid and the resulting sulphate, when neutralized with caustic soda solution was soluble in water and resembled a soap solution.

Example 3

Trieleostearyl citrate was treated in the cold with sulphuric acid. The sodium salt made by neutralization with caustic soda solution was soluble in water and exhibited cleansing properties. The eleostearyl alcohol esterified with citric acid was obtained by the sodium reduction of China-wood oil and contained two unsaturated bonds as determined by analysis of iodine absorption.

Example 4

Dodecyl acid maleate was treated in the cold with concentrated sulphuric acid, and then neutralized with caustic soda solution. The resultant product was soluble in water and when shaken, the solution formed a stable foam. Aqueous solutions of this product exhibited the cleansing action of a soap solution. The calcium salt prepared by treating an aqueous solution of the sodium salt with calcium chloride solution was soluble in water.

Example 5

Didodecyl maleate was treated in the cold with 5 parts of a mixture of 98 parts concentrated sulphuric acid and 18 parts of water. The ester formed a paste with the sulphuric acid and when warmed to about 50° formed a homogeneous solution. The acid solution was neutralized with caustic soda and when shaken the solution foamed and exhibited a cleaning action similar to that of a soap solution.

Example 6

400 parts by weight of a mixture of coconut alcohols obtained by the carboxylic hydrogenation of coconut oil, consisting of hexyl alcohol 4 parts, octyl alcohol 81 parts, decyl alcohol 60 parts, dodecyl alcohol 390 parts, tetradecyl alcohol 160 parts, cetyl alcohol 115 parts, octadecyl alcohol 55 parts, eicosyl alcohol 15 parts; 98 parts by weight of maleic anhydride; 5 parts by weight of p-toluene sulphonic acid and 1500 parts by weight of ethylene dichloride were heated together under an efficient reflux condenser until all the water of reaction was removed. The reaction mixture was washed with water, the solution dried with sodium sulphate, filtered and the filtrate heated to remove the ethylene dichloride. The resulting straw colored oil was insoluble in water but readily soluble in organic solvents such as alcohol, toluene and ethyl acetate. One part by weight of the dialkyl maleate was treated at about 10° C. with 5 parts by weight of a mixture of 98 parts concentrated sulphuric acid and 18 parts of water. The ester formed a paste with the sulphuric acid and when warmed to about 40° C. formed a homogeneous solution. The acid solution was neutralized with caustic soda solution and when shaken the solution foamed. When applied to soiled cotton cloth the solution exhibited a cleansing action similar to that of a soap solution. The sulphated esters prepared from this mixture of alcohols are particularly useful as detergents, and, because of their greater activity, are to be preferred to pure sulphated esters such as sulphated didodecyl maleate.

It is to be understood that the aforementioned examples are illustrative merely of the many modifications of the present invention. The individual components, proportion of such components, and conditions for reacting them may vary widely without departing from the scope of this invention. The products may contain one or more sulphate groups. The polycarboxylic acids and/or esterifying agents may contain one or more unsaturated linkages and/or hydroxyl groups. Such unsaturated linkages and/or hydroxyl groups may be present on either the polycarboxylic acid and/or esterifying agent, or may be present on both of the reactants. A few of the many classes of compounds falling within the scope of this invention are:

1. Sulphates of an unsaturated alcohol ester of a polybasic acid (preferably, a dibasic acid having less than 15 carbon atoms).
2. Sulphates of a saturated alcohol ester of a sulphatable polybasic acid, said acid having less than 15 carbon atoms.
3. Sulphates of an unsaturated alcohol ester of a sulphatable polybasic acid, said acid having less than 15 carbon atoms.

Polycarboxylic acids contemplated herein may advisably be selected from the aliphatic series. Furthermore, they may be saturated or may contain one unsaturated grouping. Likewise, they may contain substituents in addition to a plurality of carboxylic acid groups such as a hydroxyl group, a halogen group, etc. A few representative polycarboxylic acids selected from the aforementioned class are: succinic, malic, maleic, fumaric, adipic, citric, etc., acids.

The esterifying agents selected may be open chain or cyclic compounds. They may be, for instance, alcohols of the aliphatic, cycloaliphatic, hydrocyclic, aralkyl or naphthenic series. In place of individual alcohols, mixtures thereof may be used, the various components of which may vary from traces to major fractions. These alcohols may advantageously be obtained by the hydrogenation of acids and esters of animal, vegetable, or synthetic origin. As an illustration, oils, fats and waxes may be subjected to sodium reduction or catalytic hydrogenation, and the resulting alcohols separated from the reaction mixture. Natural sources of such alcohols are coconut oil, palm kernel oil, sperm oil, herring oil, China-wood oil, beeswax, wool fat, spermaceti, Montan wax, carnauba wax, linseed oil, castor oil, cottonseed oil, etc. Moreover, alcohols contemplated herein may be obtained by hydrating olefines, such as those produced by the cracking of petroleum products, or by interacting carbon monoxide and hydrogen under pressure and in the presence of suitable catalysts. A few of the alcohols coming within the desired category are: octyl, decyl, dodecyl, tetradecyl, cetyl, 9,10-octadecenyl, octadecyl, ricinoleyl, linoleyl, myricyl, undecenyl, eleostearyl, abietyl, naphthenyl, methyl hexalin, benzyl, etc., alcohols. The aforementioned and related alcohols may be saturated or unsaturated. Likewise, they may contain additional substituents such as one or more hydroxyl groups, halogen groups, etc.

Esterifying agents suitable for use herein are described in considerable detail in U. S. Patent 1,968,797.

The means of esterifying an acid or acid derivative with an alcohol or alcohol derivative are well known, and need not be described in detail herein. However, mention may be made of the fact that such esterification reaction may be carried out in the presence or absence of solvents, diluents and/or agents having an avidity for water. In selecting polycarboxylic acids and esterifying agents therefor it should be understood that at least one of the components should advisably contain at least one double bond or one hydroxyl group. The alcohol or other esterifying agent may, however, contain more than one double bond and/or more than one hydroxyl group. The polycarboxylic acid may be free from double bonds or hydroxyl groups, in which case the esterifying agent would contain at least one double bond and/or hydroxyl group. Furthermore, the polycarboxylic acid may contain one double bond, and the alcohol used for esterification purposes may contain one or more hydroxyl groups.

Sulphating agents which are contemplated herein may be, for example, concentrated sulphuric acid, fuming sulphuric acids, chlorsulphonic acid, etc. Sulphation may be carried out in the presence of solvents or diluents, such as water, aliphatic hydrocarbons, carbon tetrachloride, nitrobenzene, etc. This reaction is advisably carried out within the temperature range of from 0–50° C., although considerably higher temperatures may be used with satisfactory results.

As previously mentioned, the esterifying radical is preferably derived from a normal primary alcohol containing at least 8 and advisably from 12 to 18, carbon atoms. Nevertheless, it is to be understood that this radical may contain less than 8 carbon atoms, and may be derived from other alcohols than those of normal primary character. While esterification of all the carboxylic acid groups present on the polycarboxylic acid is advisable, it is not essential. One or more of said groups may be left in an unesterified condition. Moreover, one of said groups may be esterified with a given alcohol, advisably selected from the group previously referred to as preferred, and one or more of the remaining groups may be esterified with a homologue thereof or an entirely dissimilar esterifying agent.

The polycarboxylic acid, or mixture of such acids, selected should contain less than 15 carbon atoms. If more than this number of carbon atoms is present in the acid selected, the balance between the water soluble portion of the resulting ester and the water insoluble portion thereof will usually be defective, and consequently the product will not possess satisfactory detergent properties. This is particularly true where the esterifying agent contains a large number of carbon atoms.

It is clear from the above description that the products described herein may contain one sulphuric acid group on either the esterifying radical or the acid residue. Likewise, a sulphuric acid group may be present on both the esterifying radical and the acid residue. Since the detergent and related properties of the described compounds depend to a considerable extent upon the balance between the solubilizing group or groups and the non-soluble hydrocarbon residue, it is to be understood that the number and character of such solubilizing groups should be determined in accordance with the total number of carbon atoms present in the molecule. Where a molecule containing a large number of carbon atoms is produced it is in general advisable to substitute thereon more than one sulphuric acid group. This may, as previously mentioned, be accomplished by selecting polycarboxylic acids and/or alcohols containing double bonds and/or hydroxyl groups.

Sulphated derivatives produced in accordance with the aforementioned instructions are preferably neutralized with salt-forming compounds. These compounds may be of either organic or inorganic origin. All of the free acid groups present in the molecule may be reacted with such salt-forming compounds, although it is contemplated that products containing one or more free acid groups may be produced and utilized. Salt-forming compounds of inorganic character which have been found satisfactory are, for example, soda ash, caustic soda, ammonium hydroxide, caustic potash, oxides and hydroxides of calcium, magnesium, barium, lithium, etc. An illustrative few of the salt-forming compounds of organic origin which are suitable are amines such as quaternary ammonium bases, quaternary phosphonium bases, tertiary sulphonium bases, alicyclic-hydroxy-amines, cyclohexylamine, mono- and dialkyl cyclohexylamine, aralkyl substituted cyclohexylamines, piperidine, pyridine, aniline, mono-, di- and tri-alkylamines, mono-, di- and tri-alkylolamines, etc.

The products described herein are of particular value as wetting, detergent, emulsifying and dispersing agents. They are capable of use in the various processes wherein soap and soap-like products have previously been used or are capable of use. These products have been found to be of particular value either alone, in admixture with one another, and/or in admixture with prior art wetting, detergent, or emulsifying agents in the treatment of textile materials, leather, rubber, the flotation of ores, the production of salves, cosmetics, pharmaceuticals, polishing waxes and related products, etc. Since the uses of wetting, detergent, emulsifying, and dispersing agents are legion, it has not been attempted herein to describe even a small portion of the many uses for which these compounds are adapted. However, it is to be understood that wherever soap or soap-like products have been used in the past or are capable of use, it is intended that the present products may be substituted therefor or used in admixture therewith.

As many apparently widely different embodiments of this invention may be made without departing from the spirit and scope thereof, it is to be understood that the invention is not limited to the specific embodiments thereof except as defined in the appended claims.

I claim:

1. A sulphated ester having the following general formula:

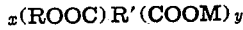

wherein R' represents the hydrocarbon residue of an aliphatic polybasic acid containing less than 7 carbon atoms and in which the carboxyl groups are joined through carbon atoms, R represents a monovalent hydrocarbon radical, M represents a member of the group consisting of hydrogen, the radical of a salt-forming compound and a monovalent hydrocarbon radical, and $x$ and $y$ are integers the sum of which is equal to the valence of R', a sulphate group being present on either R or R', but not more than one sulphate group being present on R'.

2. A sulphated ester having the following general formula:

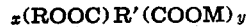

wherein R' represents the hydrocarbon residue of an aliphatic polybasic acid in which the carboxyl groups are joined through carbon atoms and which contains less than 15 carbon atoms, R represents a monovalent hydrocarbon radical containing at least 8 carbon atoms, M represents a member of the group consisting of hydrogen, the radical of a salt-forming compound and a monovalent hydrocarbon radical, and $x$ and $y$ are integers the sum of which is equal to the valence of R', a sulphate group being present on either R or R', but not more than one sulphate group being present on R'.

3. A sulphated ester having the following general formula:

wherein R' represents the hydrocarbon residue of an aliphatic polybasic acid containing less than 7 carbon atoms and in which the carboxyl groups are joined through carbon atoms, R represents a monovalent hydrocarbon radical containing at least 8 carbon atoms, M represents a member of the group consisting of hydrogen, the radical of a salt-forming compound and a monovalent hydrocarbon radical, and $x$ and $y$ are integers the sum of which is equal to the valence of R', a sulphate group being present on either R or R', but not more than one sulphate group being present on R'.

4. A sulphated ester having the following general formula:

wherein R' represents the hydrocarbon residue of an aliphatic polybasic acid containing less than 7 carbon atoms and in which the carboxyl groups are joined through carbon atoms, R represents a monovalent hydrocarbon radical containing at least 8 carbon atoms, M represents a member of the group consisting of hydrogen, the radical of a salt-forming compound and a monovalent hydrocarbon radical containing at least 8 carbon atoms, and $x$ and $y$ are integers the sum of which is equal to the valence of R', a sulphate group being present on either R or R', but not more than one sulphate group being present on R'.

5. A sulphated ester having the following general formula:

wherein R' represents the hydrocarbon residue of an aliphatic polybasic acid containing less than 15 carbon atoms and in which the carboxyl groups are joined through carbon atoms, R represents the radical of a normal primary alcohol containing at least 8 carbon atoms, and $x$ represents an integer greater than one, a sulphate group being present on either R or R', but not more than one sulphate group being present on R'.

6. A sulphated ester having the following general formula:

wherein R' represents the hydrocarbon residue of an aliphatic polybasic acid containing less than 7 carbon atoms and in which the carboxyl groups are joined through carbon atoms, R represents the radical of a normal primary alcohol containing from 8 to 18 carbon atoms, and $x$ represents an integer greater than one, a sulphate group being present on either R or R', but not more than one sulphate group being present on R'.

7. A sulphated ester having the following general formula:

wherein R' represents the hydrocarbon residue of an aliphatic polybasic acid containing less than 7 carbon atoms and in which the carboxyl groups are joined through carbon atoms, R represents the radical of a normal primary alcohol containing from 12 to 18 carbon atoms, and $x$ represents an integer greater than one, a sulphate group being present on either R or R', but not more than one sulphate group being present on R'.

8. A sulphated ester having the following general formula:

wherein R' represents the hydrocarbon residue of an aliphatic polybasic acid containing less than 15 carbon atoms and in which the carboxyl groups are joined through carbon atoms, R represents the radical of a normal primary alcohol containing from 8 to 18 carbon atoms, and $x$ represents an integer greater than one, a sulphate group being present on either R or R', but not more than one sulphate group being present on R'.

9. The product defined in claim 8 wherein a sulphate group is substituted on the polybasic acid residue, R'.

10. The product defined in claim 8 wherein a sulphate group is substituted on the alcohol radical, R.

11. The product defined in claim 8 wherein a sulphate group is substituted on both the polybasic acid residue and the alcohol radical, R and R'.

12. A sulphated ester having the following general formula:

wherein R' represents the hydrocarbon residue of an aliphatic polybasic acid containing less than 15 carbon atoms and in which the carboxyl groups are joined solely through carbon atoms, R represents a monovalent hydrocarbon radical containing from 8 to 18 carbon atoms, and $x$ represents an integer greater than one, a sulphate group being present on either R or R', but not more than one sulphate group being present on R'.

13. A monosulphated ester of an aliphatic polycarboxylic acid having not more than 6 carbon atoms, said ester having the sulphate group attached solely to a carbon atom in the hydrocarbon residue of the acid.

14. A monosulphated ester of an aliphatic polycarboxylic acid having less than 15 carbon atoms, said ester having the sulphate group directly attached to a carbon atom on the hydrocarbon residue of the acid which is in turn attached to at least two other carbon atoms.

15. A monosulphated ester of an aliphatic polycarboxylic acid having less than 15 carbon atoms in the hydrocarbon residue of the acid in which the carboxyl groups are joined solely through carbon atoms and having the sulphate group joined to a carbon atom attached to less than 2 hydrogen atoms.

16. The sodium salt of sulphated di-(9,10-octadecenyl) succinate.

17. The sodium salt of sulphated dodecyl acid citrate.

18. The sodium salt of sulphated trieleostearyl citrate.

JAMES H. WERNTZ.